United States Patent
Zhang

(10) Patent No.: US 9,456,442 B2
(45) Date of Patent: Sep. 27, 2016

(54) REFERENCE SIGNAL SENDING METHOD AND APPARATUS

(71) Applicant: Huawei Technologies Co., Ltd., Shenzhen (CN)

(72) Inventor: Xiaojuan Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 121 days.

(21) Appl. No.: 14/605,514

(22) Filed: Jan. 26, 2015

(65) Prior Publication Data

US 2015/0173052 A1    Jun. 18, 2015

Related U.S. Application Data

(63) Continuation of application No. PCT/CN2013/077527, filed on Jun. 20, 2013.

(30) Foreign Application Priority Data

Jul. 26, 2012   (CN) .......................... 2012 1 0260743

(51) Int. Cl.
  *H04W 72/04*   (2009.01)
  *H04L 5/00*    (2006.01)

(52) U.S. Cl.
  CPC .......... *H04W 72/042* (2013.01); *H04L 5/0023* (2013.01); *H04L 5/0048* (2013.01);
  (Continued)

(58) Field of Classification Search
  CPC .................................................. H04W 24/00
  See application file for complete search history.

(56) References Cited

U.S. PATENT DOCUMENTS 8,611,282 B2 * 12/2013 Kim ..................... H04B 7/0452
                                                   370/328

2010/0172424 A1   7/2010 Perets et al.
(Continued)

FOREIGN PATENT DOCUMENTS

| CN | 101834629 A | 9/2010 |
| CN | 102076076 A | 5/2011 |

(Continued)

OTHER PUBLICATIONS

"Consideration on Downlink Signalling for MU-MIMO," TSG-RAN WG1 #59, Jeju, Korea, R1-095006, $3^{rd}$ Generation Partnership Project, Valbonne, France (Nov. 9-13, 2009).
(Continued)

*Primary Examiner* — Andrew Lai
*Assistant Examiner* — Zhiren Qin
(74) *Attorney, Agent, or Firm* — Leydig, Voit & Mayer, Ltd.

(57) ABSTRACT

The embodiments of the present invention disclose a reference signal sending method and apparatus. The method includes: determining, by a network node, ports and the number of layers used for transmitting downlink specific reference signals to user equipment; generating, by the network node, downlink control signaling according to the ports and the number of layers, wherein 5-bits signaling in the downlink control signaling is used to indicate the user equipment the ports and the number of layers used for transmitting the downlink specific reference signals, in order to support multiplexing of at most eight user equipment; and sending, by the network node, the downlink control signaling to the user equipment, and sending the downlink specific reference signals to the user equipment according to the determined ports and the number of layers. By adopting the present invention, the maximum number of multiplexed streams may be increased.

13 Claims, 6 Drawing Sheets

(52) U.S. Cl.
CPC ........... *H04L5/0053* (2013.01); *H04L 5/0091* (2013.01); *H04L 5/0094* (2013.01); *H04L 5/0007* (2013.01); *H04L 5/0051* (2013.01)

(56) References Cited

U.S. PATENT DOCUMENTS

| | | | | |
|---|---|---|---|---|
| 2011/0194536 | A1* | 8/2011 | Kim | H04L 5/0023 370/335 |
| 2011/0249602 | A1* | 10/2011 | Wennstrom | H04L 1/0041 370/310 |
| 2011/0268050 | A1* | 11/2011 | Farajidana | H04L 25/0226 370/329 |
| 2012/0057562 | A1 | 3/2012 | Kim et al. | |
| 2012/0176884 | A1* | 7/2012 | Zhang | H04B 7/024 370/203 |
| 2012/0195271 | A1* | 8/2012 | Lee | H04L 5/003 370/329 |
| 2012/0207119 | A1* | 8/2012 | Zhang | H04L 5/0023 370/329 |
| 2012/0224555 | A1* | 9/2012 | Lee | H04W 52/143 370/329 |
| 2013/0064226 | A1* | 3/2013 | Dinan | H04W 36/30 370/332 |
| 2013/0155921 | A1* | 6/2013 | Gomadam | H04K 1/02 370/310 |
| 2013/0235811 | A1 | 9/2013 | Li et al. | |
| 2013/0265951 | A1* | 10/2013 | Ng | H04W 72/042 370/329 |
| 2014/0105165 | A1* | 4/2014 | Dinan | H04L 27/2692 370/329 |
| 2015/0055576 | A1* | 2/2015 | Zhang | H04W 72/14 370/329 |

FOREIGN PATENT DOCUMENTS

| | | |
|---|---|---|
| CN | 102246481 A | 11/2011 |
| CN | 102315870 A | 1/2012 |
| EP | 2418783 A2 | 2/2012 |
| EP | 2503825 A1 | 9/2012 |
| WO | WO 2011062066 A1 | 5/2011 |
| WO | WO 2011124099 A1 | 10/2011 |
| WO | WO 2012148207 A2 | 11/2012 |

OTHER PUBLICATIONS

"On the use of DM RS ports/scrambling sequences for MU-MIMO," 3GPP TSG-RAN WG1 Meeting #61, Montreal, Canada, R1-103056, 3$^{rd}$ Generation Partnership Project, Valbonne, France (May 10-14, 2010).

"Remaining Details of Transmission Mode 9 and DCI 2C," 3GPP TSG RAN WG1 Meeting #62bis, Xi'An, China, R1-105534, 3$^{rd}$ Generation Partnership Project, Valbonne, France (Oct. 11-15, 2010).

"Details of DCI Format 2C," 3GPP TSG RAN WG1 Meeting #62bis, Xi'An, China, Tdoc R1-105206, 3$^{rd}$ Generation Partnership Project, Valbonne, France (Aug. 11-15, 2010).

\* cited by examiner

REFERENCE SIGNAL SENDING METHOD AND APPARATUS

CROSS-REFERENCE TO RELATED APPLICATIONS

This application is a continuation of International Patent Application No. PCT/CN2013/077527, filed on Jun. 20, 2013, which claims priority to Chinese Patent Application No. 201210260743.3, filed on Jul. 26, 2012, both of which are hereby incorporated by reference in their entireties.

FIELD OF THE INVENTION

The present invention relates to field of wireless communications, and particularly, to a reference signal sending method and apparatus.

BACKGROUND OF THE INVENTION

With the continuous development of mobile communication technology, a variety of different communication systems have emerged constantly. A development trend of an existing communication system is a long term evolution (Long Term Evolution, LTE) system, an LTE technology mainly supports high speed data transmission based on an orthogonal frequency division multiple access (Orthogonal Frequency Division Multiple Access, OFDMA) technology and a multiple-input multiple-out-put (Multiple-Input Multiple-Out-put, MIMO) technology. The two technologies have advantages unmatched by other technologies on such aspects as improving data transmission, improving spectrum efficiency and the like, and can exponentially improve the capacity and spectrum efficiency of the communication system without increasing the bandwidth, thus becoming key technologies of the next generation of wireless transmission systems.

Furthermore, with the in-depth study of a multi-antenna technology, the communication system has been expanded from a point-to-point single-user system to a point-to-multipoint multiuser system. In the LTE system, a multi-antenna multiplexing gain is generally achieved by the MIMO technology pre-coded by a sending end, in order to expand the multiuser channel capacity area. The information of a plurality of users may be transmitted on the same time, frequency domain and code domain resources by adopting a spatial division multiple access (Spatial Division Multiple Access, SDMA) technology on the basis of the MIMO technology pre-coded by the sending end, thus compared with a single-user MIMO system, the system capacity and the spectrum efficiency thereof may be greatly improved.

Enhanced downlink MIMO is one of the key technologies of LTE, but the technology still has some problems influencing the multiuser MIMO performance at present, for example, the maximum number of multiplexed streams is merely 4 (i.e., multiplexing of at most 4 users is supported), and the maximum number of multiplexed streams of each user is 2.

SUMMARY OF THE INVENTION

Technical problems to be solved in the embodiments of the present invention is to provide a reference signal sending method and apparatus, which may increase the maximum number of multiplexed streams.

To solve the above-mentioned technical problems, on one hand, the embodiments of the present invention provide a reference signal sending method, used in an LTE network, including:
  a network node determines ports and the number of layers used for transmitting downlink specific reference signals to user equipment;
  the network node generates downlink control signaling according to the ports and the number of layers, wherein 5-bits signaling in the downlink control signaling is used to indicate the user equipment the ports and the number of layers used for transmitting the downlink specific reference signals, in order to support multiplexing of at most eight user equipment; and
  the network node sends the downlink control signaling to the user equipment, and sends the downlink specific reference signals to the user equipment according to the determined ports and the number of layers, for enabling the user equipment to receive the downlink specific reference signals according to the downlink control signaling.

Wherein, at least eight values in the 5-bits signaling are used to indicate two ports used for transmitting the downlink specific reference signals when the number of layers is 2, and a part of or all of the remaining values are configured to indicate the ports used for transmitting the downlink specific reference signals in the case of other number of layers.

The at least eight values indicate two ports used for transmitting the downlink specific reference signals when the number of layers is 2, including: eight values are used to sequentially indicate the ports used for transmitting the downlink specific reference signals: (7, 8), (9, 10), (11, 13), (12, 14), (7, 9), (8, 10), (11, 12) or (13, 14).

A part of or all of the remaining values are configured to indicate the ports used for transmitting the downlink specific reference signals in the case of other number of layers, including:
  at least six values in the remaining values indicate three ports used for transmitting the downlink specific reference signals when the number of layers is 3, and the downlink specific reference signals transmitted on the three ports are code division and/or frequency division;
  at least four values in the remaining values indicate four ports used for transmitting the downlink specific reference signals when the number of layers is 4, and the downlink specific reference signals transmitted on the four ports are code division and/or frequency division;
  at least one value in the remaining values indicates five ports used for transmitting the downlink specific reference signals when the number of layers is 5;
  at least one value in the remaining values indicates six ports used for transmitting the downlink specific reference signals when the number of layers is 6;
  at least one value in the remaining values indicates seven ports used for transmitting the downlink specific reference signals when the number of layers is 7;
  at least one value in the remaining values indicates eight ports used for transmitting the downlink specific reference signals when the number of layers is 8.

On the other hand, the embodiments of the present invention further provide a reference signal sending apparatus, used in an LTE network, including:
  a port determining module, configured to determine ports and the number of layers used for transmitting downlink specific reference signals to user equipment;
  a signaling generating module, connected with the port determining module, and configured to generate downlink control signaling according to the ports and the number of layers, wherein 5-bits signaling in the downlink control signaling is used to indicate the user equipment the ports and the number of layers used for transmitting the downlink specific reference signals, in order to support multiplexing of at most eight user equipment; and a transmitting module, connected with the signaling generating module, and configured to send the downlink control signaling to the user equipment, and send the downlink specific reference signals to the user equipment according to the determined ports and the number of layers, for enabling the user equipment to receive the downlink specific reference signals according to the downlink control signaling.

Wherein, the downlink control signaling generated by the signaling generating module further includes one bit of signal to indicate a scrambling identity, in order to support multiplexing of at most sixteen user equipment.

The ports indicated by the 5-bits signaling in the downlink control signaling generated by the signaling generating module are antenna ports 7 to 14 defined in LTE R10.

In the 5-bits signaling in the downlink control signaling generated by the signaling generating module:

at least eight values indicate two ports used for transmitting the downlink specific reference signals when the number of layers is 2, and a part of or all of the remaining values are configured to indicate the ports used for transmitting the downlink specific reference signals in the case of other number of layers; or, at least eight values indicate two ports used for transmitting the downlink specific reference signals when the number of layers is 2, at least eight values indicate one port used for transmitting the downlink specific reference signals when the number of layers is 1, and a part of or all of the remaining values are configured to indicate the ports used for transmitting the downlink specific reference signals in the case of other number of layers.

In the downlink control signaling generated by the signaling generating module, eight values are used to sequentially indicate the ports used for transmitting the downlink specific reference signals: (7, 8), (9, 10), (11, 13), (12, 14), (7, 9), (8, 10), (11, 12) or (13, 14).

Further, the downlink control signaling generated by the signaling generating module may be DCI2C signaling.

On another hand, the embodiments of the present invention further provide a network node, including the above-mentioned reference signal sending apparatus.

The implementation of the embodiments of the present invention has the following beneficial effects: in the embodiments of the present invention, a 3-bits signaling is added in the existing 2-bits downlink control signaling, thus a 5-bits signaling in total is configured to indicate the ports and the number of layers used for transmitting the downlink specific reference signals, since the 5-bits signaling may indicate 32 different values in total, multiplexing of at most eight users may be achieved by properly setting the ports and the number of layers used for transmitting the downlink specific reference signals and indicated by different values, so as to improve the maximum number of multiplexed streams of the system.

BRIEF DESCRIPTION OF THE DRAWINGS

To illustrate technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, based on which other drawings may be obtained by those of ordinary skill in the art without any creative effort.

DETAILED DESCRIPTION OF THE EMBODIMENTS

Figure 1:
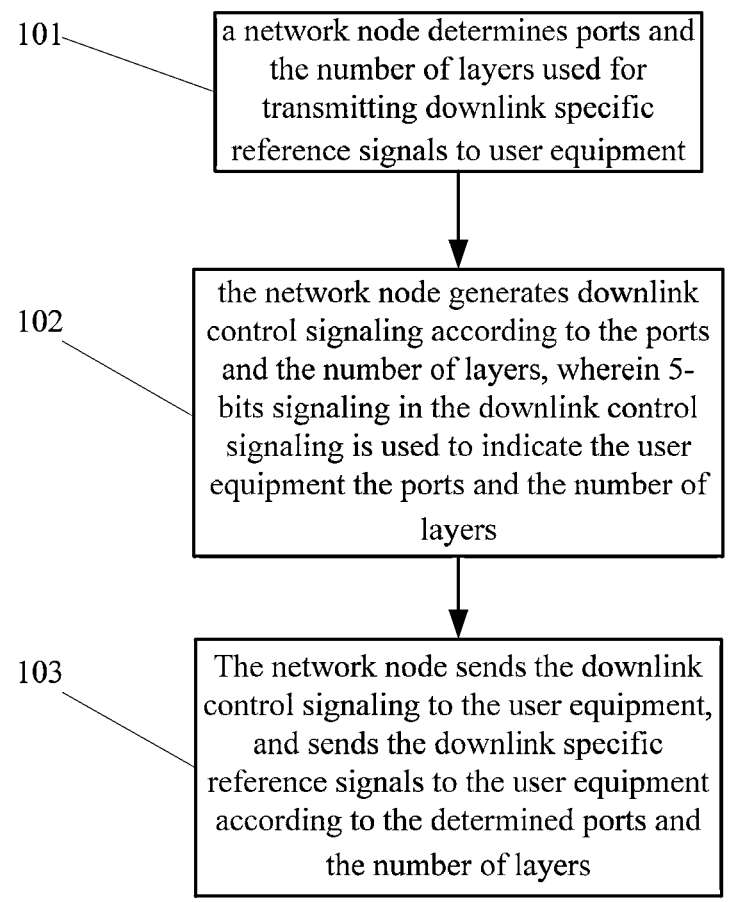
FIG. 1 is a schematic diagram of a specific flow of a reference signal sending method in an embodiment of the present invention.
Figure 2A:
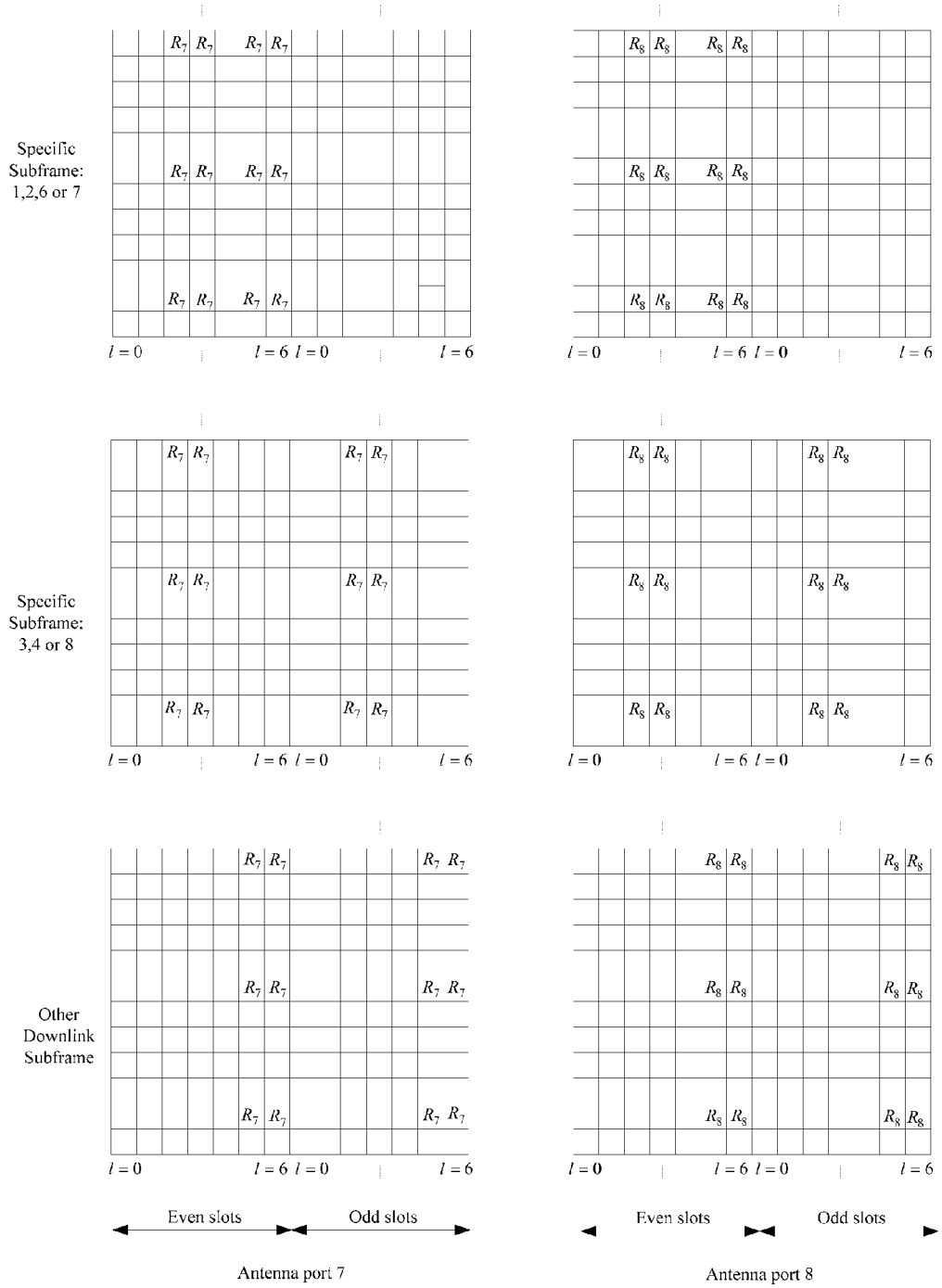
FIGS. 2A-2D are schematic diagrams of a pilot pattern of antenna ports 7-14 in an embodiment of the present invention.
Figure 2B:
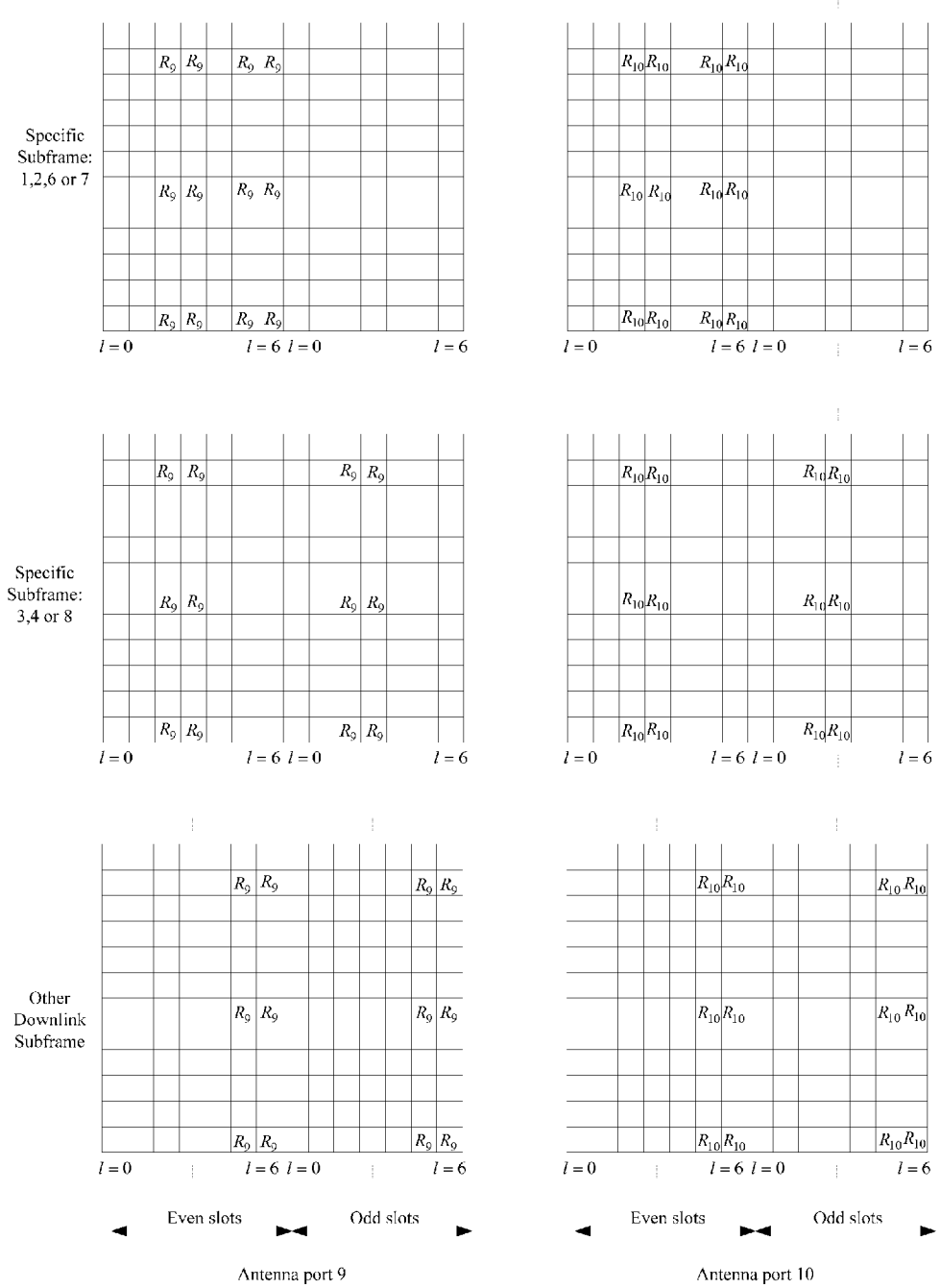
Figure 2C:
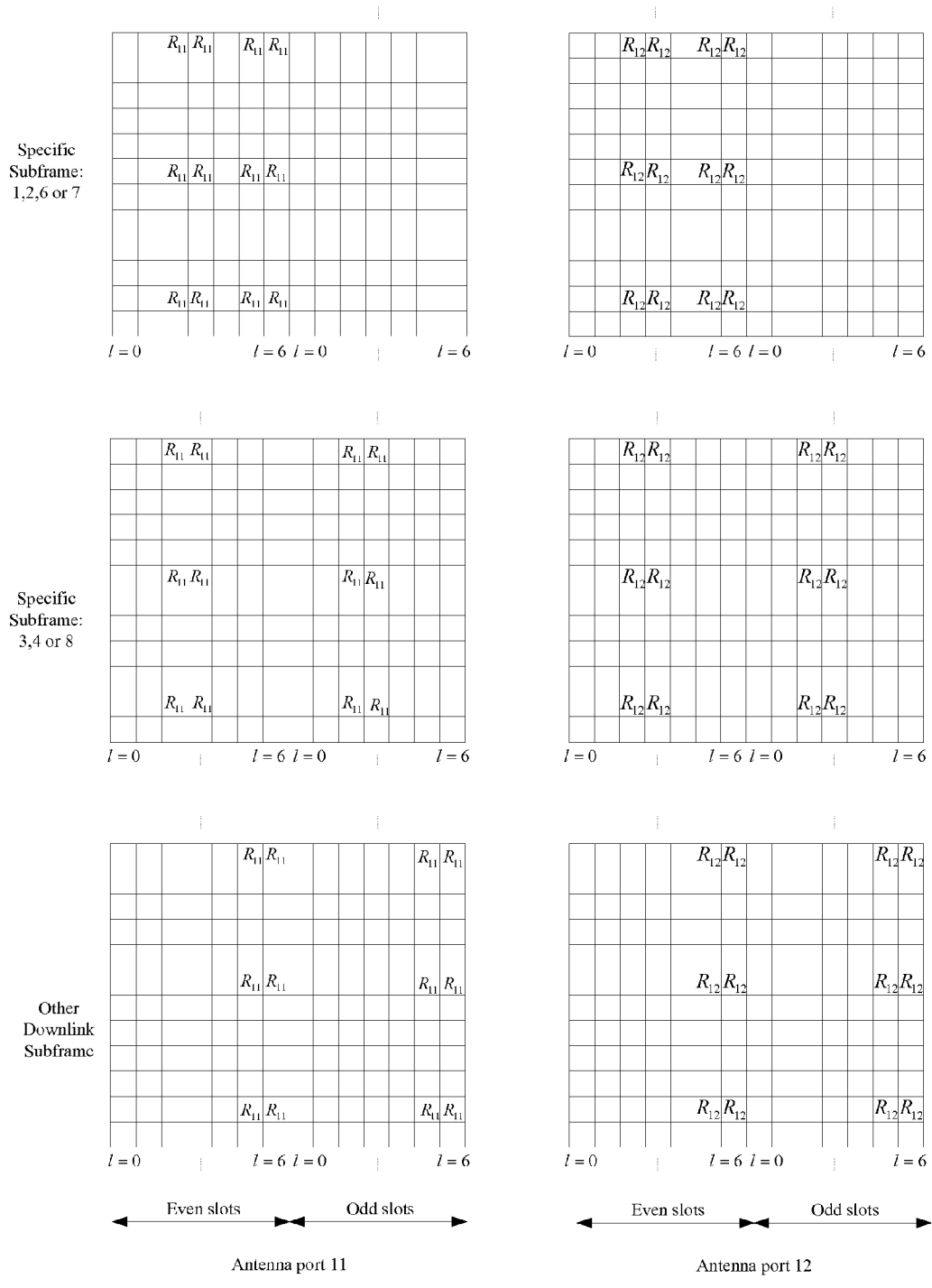
Figure 2D:
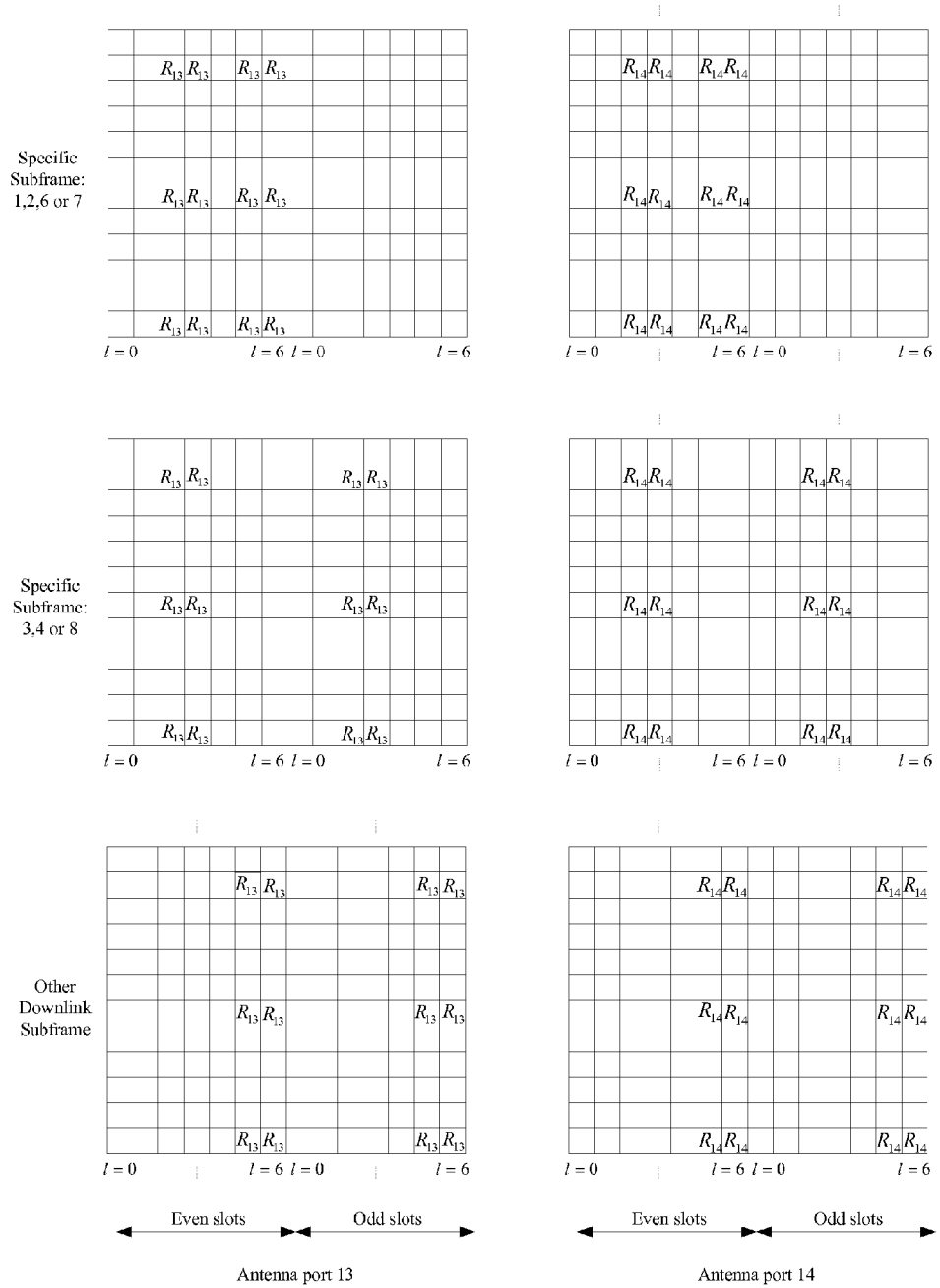

A clear and complete description of technical solutions in the embodiments of the present invention will be given below, in combination with the accompanying drawings in the embodiments of the present invention. Apparently, the embodiments described are merely a part, but not all, of the embodiments of the present invention. All of other embodiments, obtained by those of ordinary skill in the art based on the embodiments of the present invention without any creative effort, fall into the protection scope of the present invention.

In an LTE system, for example, under LTE transmission modes (Transmission Mode, TM) 8 and TM9, in the case of signaling indication and user multiplexing, a multiuser multiplexing effect is achieved by adopting the manners of orthogonal codes and orthogonal scrambling sequences. In a multiuser multiplexing scenario, the inventor has found in the study of the prior art that, it is regulated in the TM8 that the number of multiplexing users and ports (port) indicated by a downlink control information format 2B (Downlink control information format 2B, DCI2B signaling) and a downlink control information format 2C (Downlink control information format 2C, DCI2C signaling) are completely the same, and multiplexing effect of more users is not achieved by the combination of 8 antenna ports.

While in the embodiments of the present invention, based on an eight ports user equipment-specific reference signal (User Equipment-specific Reference signal, UE-specific Reference signal) defined in an LTE release 10 (Rel-10, R10), the sending of more than four layers of multiuser MIMO pilot and downlink signaling may be achieved. For example, it may be considered to increase 3 bits (bit) of overhead of DCI2C, wherein 1 bit is configured to indicate a scrambling identity (scrambling identity), 2 bits, together with the original antenna ports (Antenna port (s)) 3 bits, 5 bits in total is configured to indicate the used antenna ports (Antenna port (s), referred to as port hereinafter) and the number of layers (number of layers).

In this way, 5-bits signaling may indicate 32 values, as long as the indication contents of the 32 values are configured properly, pilot sending conditions on eight ports may be indicated, in order to achieve the multiplexing of at most eight users (namely, 8-stream multiplexing). Plus 1 bit of scrambling identity (scrambling identity), two groups of pseudo-orthogonal pilot sending conditions on the eight ports are indicated, in order to achieve the multiplexing of at most sixteen users.

Namely, in the UE-specific reference signal, two groups of different pilots may be generated according to different scrambling identity contents, and the two groups of pilots are pseudo-orthogonal, in this way, the user equipment may decode to obtain two groups of different reference signals according to the difference of the received scrambling identity; namely, when the reference signals are sent on the eight ports, the above-mentioned two groups of pseudo-orthogonal reference signals may be simultaneously sent on each port, and after receiving the reference signals, the user equipment may correspondingly decode the same according to the scrambling identity. Therefore, the multiplexing of at most sixteen users (namely, 16-stream multiplexing) may be achieved.

For example, in the LTE R10, the definition of a pilot sequence is as follows:

$$r(m) = \frac{1}{\sqrt{2}}(1 - 2*c(2m)) + j\frac{1}{\sqrt{2}}(1 - 2*c(2m+1)),$$

$$m = 0, 1, \ldots, 12N_{RB}^{DLMAX} - 1$$

The initialization of a pseudorandom sequence thereof is:

$$c_{init} = (\lfloor n_s/2 \rfloor + 1)*(2N_{ID}^{cell}+1)*2^{16}+n_{SCID}, \text{ wherein,}$$
$$n_{SCID} \in \{0,1\}$$

$n_{SCID}$ is defined as the scrambling identity (scrambling identity) in the embodiments of the present invention, and may be dynamically configured in the downlink control signaling. If not configured, it is assumed to be 0 or 1. In this way, in the embodiments of the present invention, the $n_{SCID}$ is combined with the eight ports, to simultaneously send sixteen groups of pilots on the eight ports, so as to support the multiplexing of at most sixteen steams in one cell.

As shown in FIG. 1, it is a schematic diagram of a specific flow of a reference signal sending method in an embodiment of the present invention. The method is used in an LTE network, and includes the following steps:

101. a network node determines ports and the number of layers used for transmitting downlink specific reference signals to user equipment. Specifically, the network node may determine the ports and the number of layers used for transmitting the downlink specific reference signals to the user equipment according to the channel conditions of the current user equipment, and may determine the multiplexed user equipment. For example, an eNB selects proper multiplexed (or called paired) user equipment according to the channel conditions (channel characteristic indices such as signal to interference plus noise power ratio, relativity or the like) of the current user equipment, to obtain the port and the number of layers occupied by each multiplexed user equipment. The specific multiplexing conditions and port allocation may refer to illustration in the following steps.

102. the network node generates downlink control signaling according to the ports and the number of layers, wherein 5-bits signaling in the downlink control signaling is used to indicate the user equipment the ports and the number of layers used for transmitting the downlink specific reference signals, in order to support multiplexing of at most eight user equipment. Moreover, the downlink control signaling further includes 1 bit of signal indication scrambling identity, in order to support multiplexing of at most sixteen user equipment; the specific implementation principle may refer to the foregoing illustration, and will not be repeated redundantly herein.

Since the 5-bits signaling has 32 values in total, different values may indicate different ports and numbers of layers. For example, in the 5-bits signaling: at least eight values indicate 1 port used for transmitting the downlink specific reference signals when the number of layers is 1; at least eight values indicate two ports used for transmitting the downlink specific reference signals when the number of layers is 2. A part of or all of the remaining values are configured to indicate the ports used for transmitting the downlink specific reference signals in the case of other number of layers. Namely, a part of the remaining values may be configured to indicate the port conditions in the case of other number of layers, and the remaining is reserved bits; and at present, all of the remaining values may be configured to indicate the port conditions in the case of other number of layers. Of course, for the condition of two codewords, the port allocation when the number of layers is 1 may not be indicated.

Specifically, the following conditions may exist in the remaining values: at least six values indicate three ports used for transmitting the downlink specific reference signals when the number of layers is 3; at least four values indicate four ports used for transmitting the downlink specific reference signals when the number of layers is 4; at least one value indicates five ports used for transmitting the downlink specific reference signals when the number of layers is 5; at least one value indicates six ports used for transmitting the downlink specific reference signals when the number of layers is 6; at least one value indicates seven ports used for transmitting the downlink specific reference signals when the number of layers is 7; at least one value indicates eight ports used for transmitting the downlink specific reference signals when the number of layers is 8.

Of course, generally speaking, in the case of multiuser multiplexing, the number of layers is mostly 2; then in the 5-bits signaling, when the number of layers is 3-8, all or a part is not completely indicated. In the case of 2 codewords (Two Codewords), when the codeword 0 is enabled and the codeword 1 is also enabled, the condition when the number of layers is 1 does not need to be indicated.

When the different values of the 5-bits signaling are configured to indicate the conditions of different ports and numbers of layers, by considering the code division and frequency division conditions between intra-user multiplexing and inter-user multiplexing in the multiplexed streams, port combinations under different numbers of layers may be planned. For example, when the number of layers is 2, in the combination of two used ports, the frequency division or code division condition between the two ports may be included. When the number of layers is 3, code division signals and/or frequency division signals exist between the downlink specific reference signals transmitted on the three ports. When the number of layers is 4, code division signals and/or frequency division signals exist between the downlink specific reference signals transmitted on the four ports.

Wherein the ports indicated by the 5-bits signaling may be antenna ports 7-14 defined in LTE R10. The definition of a pilot pattern of the UE-specific reference signal on the antenna ports 7-14 is as shown in FIG. 2. The code division signals exist between the reference signals sent by the ports 7, 8, 11, 13, and the code division signals exist between the reference signals sent by the ports 9, 10, 12, 14; and the frequency division signals exist between the two groups of the ports 7, 8, 11, 13 and the ports 9, 10, 12, 14. Of course, with the continuous development of the LTE technology, new standards may be evolved, such as LTE R12, LTE R13 or the like, new conditions of antenna ports may be defined in these standards, as long as the number of these antenna ports is larger than or equal to 8, and the reference signals sent by the eight ports have frequency division and code division relationships, the technical solutions disclosed in the embodiments of the present invention may be applied in the new standards, with the antenna ports defined in the LTE R10 and the thoughts described in the embodiments of the present invention as the principle.

For the antenna ports defined in the R10, when the number of layers is 2, the two ports used for transmitting the downlink specific reference signals may be (7, 8), (9, 10), (11, 13), (12, 14), (7, 9), (8, 10), (11, 12) or (13, 14). Thus, in the eight values, both the code division combination conditions of the two ports and the frequency division combination conditions of the two ports are included.

Wherein the above-mentioned downlink control signaling may be DCI2C signaling; of course, the downlink control signaling may also be other signaling specifically, and is not limited herein, as long as the signaling may carry information of a corresponding bit number. As shown in Table 1, it shows antenna ports defined based on R10 in the embodiment of the present invention and field indications of the DCI2C signaling.

conditions in a group of ports (for example, port combinations (7, 8), (9, 10) or the like), and also include frequency division conditions in a group of ports (for example, port combination (7, 9) or the like).

When the number of layers is 3, the combinations of the three ports include the code division conditions in a group of ports (for example, port combinations (7, 8, 11), (9, 10, 12) or the like), and also include the conditions in which the code division and the frequency division coexist in a group of ports (for example, port combination (7, 8, 9), wherein the code division exists between the ports 7 and 8, and the frequency division exists between the ports (7, 8) and the port 9).

When the number of layers is 4, the combinations of the four ports include the code division conditions in a group of ports (for example, port combinations (7, 8, 11, 13), (9, 10, 12, 14) or the like), and also include the conditions in which the code division and the frequency division coexist in a group of ports (for example, port combination (7, 8, 9, 10), wherein the code division exists between the ports 7 and 8, the code division exists between the ports 9 and 10, and the frequency division exists between the ports (7, 8) and the ports (9, 10)).

103. The network node sends the downlink control signaling to the user equipment, and sends the downlink specific reference signals to the user equipment according to

TABLE 1

| One codeword effective (One Codeword): Codeword (Codeword) 0 enabled (enabled), Codeword 1 disabled (disabled) | | Two codeword effective (Two Codeword): Codeword 0 enabled, Codeword 1 enabled | |
|---|---|---|---|
| Value Meaning | Value Meaning | Value Meaning | Value Meaning |
| 0 1 layer, port 7 | 16 three layers, ports (7, 8, 11) | 0 2 layers, ports (7, 8) | 16 four layers, ports (7, 8, 9, 10) |
| 1 1 layer, port 8 | 17 three layers, ports (9, 10, 12) | 1 2 layers, ports (9, 10) | 17 four layers, ports (11, 12, 13, 14) |
| 2 1 layer, port 9 | 18 three layers, ports (7, 8, 9) | 2 2 layers, ports (11, 13) | 18 five layers, ports 7-11 |
| 3 1 layer, port 10 | 19 three layers, ports (10, 11, 12) | 3 2 layers, ports (12, 14) | 19 six layers, ports 7-12 |
| 4 1 layer, port 11 | 20 three layers, ports (7, 9, 10) | 4 2 layers, ports (7, 9) | 20 seven layers, ports 7-13 |
| 5 1 layer, port 12 | 21 three layers, ports (8, 11, 12) | 5 2 layers, ports (8, 10) | 21 eight layers, ports 7-14 |
| 6 1 layer, port 13 | 22 four layers, ports (7, 8, 11, 13) | 6 2 layers, ports (11,12) | 22 reserved |
| 7 1 layer, port 14 | 23 four layers, ports (9, 10, 12, 14) | 7 2 layers, ports (13,14) | 23 reserved |
| 8 2 layers, ports (7, 8) | 24 four layers, ports (7, 8, 9, 10) | 8 three layers, ports (7, 8, 11) | 24 reserved |
| 9 2 layers, ports (9, 10) | 25 four layers, ports (11, 12, 13, 14) | 9 three layers, ports (9, 10, 12) | 25 reserved |
| 10 2 layers, ports (11, 13) | 26 five layers, ports 7-11 | 10 three layers, ports (7, 8, 9) | 26 reserved |
| 11 2 layers, ports (12, 14) | 27 six layers, ports 7-12 | 11 three layers, ports (10, 11, 12) | 27 reserved |
| 12 2 layers, ports (7, 9) | 28 seven layers, ports 7-13 | 12 three layers, ports (7, 9, 10) | 28 reserved |
| 13 2 layers, ports (8, 10) | 29 eight layers, ports 7-14 | 13 three layers, ports (8, 11, 12) | 29 reserved |
| 14 2 layers, ports (11, 12) | 30 reserved | 14 four layers, ports (7, 8, 11, 13) | 30 reserved |
| 15 2 layers, ports (13, 14) | 31 reserved | 15 four layers, ports (9, 10, 12, 14) | 31 reserved |

In the embodiment, when the number of layers is 2, the combinations of the two ports include the code division the determined ports and the number of layers, for enabling the user equipment to receive the downlink specific reference signals according to the downlink control signaling. The specific sending condition of the reference signals and the signaling sent to the users in the step are related to an actual multiplexing condition.

For example, the multiplexing condition may include intra-user code division multiplexing and inter-user frequency division multiplexing. Namely, the same user adopts multiple layers to transmit signals, the port combinations used by the multiple layers are code division port combinations, in the case of multiplexing of different users, multiple ports are used for transmitting, and these ports are frequency division ports. For example, based on the condition of table 1, in the case that one codeword is effective: if the value of DCI2C sent to a user A is 8, it indicates that the user A adopts the number of layers of 2 and transmits the reference signals through the ports 7 and 8, and this condition is intra-user code division multiplexing; if the value of the DCI2C sent to a user B is 9, it indicates that the user B adopts the number of layers of 2 and transmits the reference signals through the ports 9 and 10, and this condition is intra-user code division multiplexing; and frequency division multiplexing exists between the user A and the user B.

Similarly, the multiplexing condition may also be intra-user frequency division multiplexing and inter-user code division multiplexing. For example, based on the condition of table 1, if the value of the DCI2C sent to the user A is 12, it indicates that the user A adopts the number of layers of 2 and transmits the reference signals through the ports 7 and 9, and this condition is intra-user frequency division multiplexing; if the value of the DCI2C sent to the user B is 13, it indicates that the user B adopts the number of layers of 2 and transmits the reference signals through the ports 8 and 10, and this condition is intra-user frequency division multiplexing; and code division multiplexing exists between the user A and the user B (7 and 8, 9 and 10).

Since a specific pilot code adopts an orthogonal convolutional code, (Orthogonal Convolutional Code, OCC), a receiving end achieves the objective of separating the ports through a joint solving equation of time domain symbols, the premise assumption of the operation is as follows: a channel does not change or slowly changes within the range of the time domain symbols participating in the operation, and only when the joint solving equation is performed on the time domain symbols, the channel information of other ports excluding the target port may be counteracted. For example, an equation set of $x1+y1=c1$, $x2-y2$ $c2$ is set to solve x, y (x, y herein may be understood as the channel coefficients of the ports), only when $x1 x2$ and $y1 y2$, the equation set may be solved correctly, if the above-mentioned assumption is untenable, the equation set is stilled solved according to the foregoing solving equation, then the error of the obtained value is quite large.

Therefore, if the intra-user code division and inter-user frequency division are used. The advantages are as follows: in the case of good orthogonality of a weight, the multiplexing condition may be satisfied; and when the inter-user spatial isolation is relatively weak, smaller inter-user interference may be obtained through inter-user pilot frequency division. The defects are as follows: channel fading is liable to break the orthogonality of an orthogonal code and is easy to introduce larger inter-stream interference. Therefore, the intra-user code division and inter-user frequency division are suitable for a single-user multi-stream scenario with high weight orthogonality.

If the intra-user frequency division and inter-user code division are used. The advantages are as follows: in the case of intra-user pilot frequency division, each port is equivalent to a single stream, so that the inter-stream interference is smaller. The defects are as follows: the requirements on the paired users are very strict, and the orthogonality between the paired users is required to be very good, otherwise it is liable to introduce larger inter-user interference. Therefore, the intra-user frequency division and inter-user code division are suitable for a scenario with a larger paired user candidate set and high orthogonality between the paired users.

In the step 101, when determining the ports and the number of layers used for transmitting the downlink specific reference signals to the user equipment, the above-mentioned factors may be considered.

In a specific embodiment, when the above-mentioned method is applied to "transparent" multiuser MIMO, an evolved node B (evolved NodeB, eNB) selects proper paired users according to the channel conditions (channel characteristic indices such as signal to interference plus noise power ratio, relativity or the like) of the current user, obtains the number of data layers (or called rank) and occupied port (data+ interference) of the current user, obtains the specific value of the downlink control signaling to be sent to corresponding user equipment according to the antenna ports (antenna port (s)), the number of layers and the table 1, and sends the downlink control signaling to the user equipment, for example, DCI2C.

UE receives and analyzes the DCI2C to obtain the number of layers and the port indication of this transmission, the interference information of the paired port may be obtained in such manners as blind detection or the like (for example, the downlink control signaling as shown in table 1 indicates the port of the current user, due to the "transparent" multiuser relationship, the information of the paired user is not known, at this time, the interference information may be obtained by adopting the blind detection manner, and the interference information refers to receiving signal characteristics on other port excluding the port used by the current user), for example, a channel estimation result is solved by assuming the existence of a paired port, whether the assumption is tenable is judged according to receiving energy, if the paired port has stronger receiving energy, the interference information is obtained (generally expressed by an interference covariance matrix). Meanwhile, the UE obtains the service data and ACK/NACK feedback of this transmission by MIMO balance.

When being applied to "nontransparent" multiuser MIMO, the eNB selects proper paired users according to the channel conditions (channel characteristic indices such as signal to interference plus noise power ratio, relativity or the like) of the current user, obtains the number of layers after pairing and all occupied ports, and obtains the specific value of the downlink control signaling to be sent to corresponding user equipment according to the antenna port (s), the number of layers and the table 1. The eNB side maintains a power allocation table, only allocates power to the port having data transmission of the current user, and allocates no power to the interfering port. The eNB sends the downlink control signaling to the user equipment, for example, DCI2C.

The UE side receives and analyzes the DCI2C to obtain the total number of layers and all occupied port indication of this transmission, and performs MIMO balance on dimensionality of the total number of layers. Since the interfering port has no power transmission in the balance process, the codeword corresponding to the interfering port is consistently NACK. Since having no idea about the power, the UE side performs ACK/NACK feedback according to an actual balance result, and after receiving the feedback, the eNB side judges whether this transmission is correct according to the maintained power allocation table.

Namely, for the "nontransparent" multiuser, the current user not only knows the port occupied by itself, but also knows the port occupied by the paired user thereof, for example, in each two users, each user is paired in two layers (the two users are two codeword effective type), port 7/8 is allocated to the user A, 9/10 is allocated to the user B, for the user A: value (value) 16 is sent, power is only allocated to the port 7/8, the receiving end performs balance and verification (equivalent to that interference is known) according to 4 streams, since having sending power, the port 7/8 has ACK/NACK information reflecting actual demodulation capability, since having no sending power, the ACK/NACK information of the port 9/10 is NACK consistently, a receiving side feeds back the obtained ACK/NACK information to a sending side, since the power allocation information of the ports is maintained by the sending end, the sending side only relates the ACK/NACK information corresponding to the port having sending power, and discards the ACK/NACK information without allocated power.

It can be seen from the above-mentioned descriptions that, in the embodiment of the present invention, under the configuration that an appointed Scrambling identity or the downlink indication signaling includes no Scrambling identity, namely, when only the 5-bits signaling in the downlink indication signaling is depended on, the multiplexing of at most eight users may be achieved, and the accumulated use number of layers is 8; if the 5-bits signaling and the Scrambling identity are cooperatively used, the multiplexing of at most sixteen users may be achieved, and the accumulated use number of layers of all user equipment (User Equipment, UE) is 16.

Under a multiuser multiplexing mode, the solution in the embodiment of the present invention may be flexibly configured according to an actual wireless environment, a user number of the system and the spatial characteristics of the paired users. Compared with an existing protocol solution, the combination number of the solution is more, such that TM9 may be applied to a multiuser scenario more conveniently, in order to give full play to the advantages of 8 streams and effectively improve the spectrum efficiency.

Further, according to different channel conditions, a corresponding number of ports are selected from port sets S1={7, 8, 11, 13}, S2={9, 10, 12, 14}, to achieve two port combination solutions during multiplexing: intra-user code division and intra-user frequency division. Moreover, the solution may also simultaneously satisfy the requirements of "transparent" multiuser MIMO and "nontransparent" multiuser MIMO.

The embodiment of the present invention further provides a computer storage medium, a computer program is stored in the computer storage medium, and the computer program may implement the steps as shown in FIG. 1.

Figure 3:
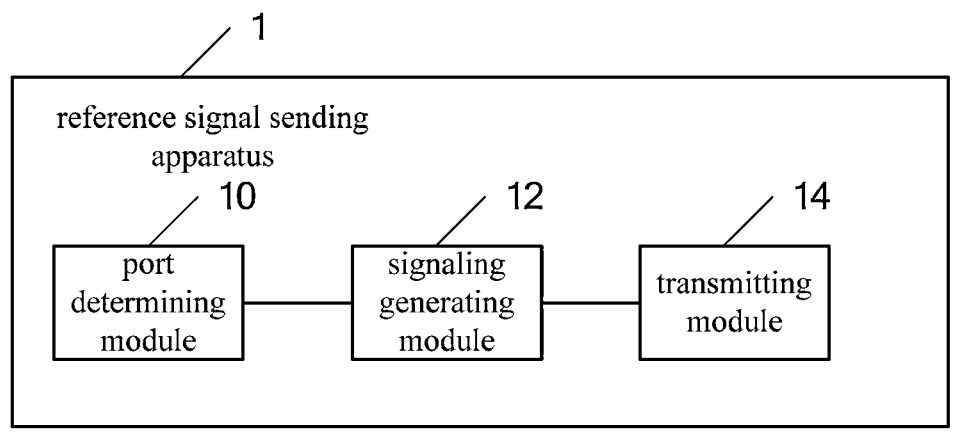
FIG. 3 is a schematic diagram of a specific composition of a reference signal sending apparatus in an embodiment of the present invention.

As shown in FIG. 3, it is a schematic diagram of a specific composition of a reference signal sending apparatus in an embodiment of the present invention. The apparatus may be arranged in a network node, for example, an evolved node B (eNB). The apparatus 1 includes: a port determining module 10, configured to determine ports and the number of layers used for transmitting downlink specific reference signals to user equipment; a signaling generating module 12, connected with the port determining module 10, and configured to generate downlink control signaling according to the ports and the number of layers, wherein 5-bits signaling in the downlink control signaling is used to indicate the user equipment the ports and the number of layers used for transmitting the downlink specific reference signals, in order to support multiplexing of at most eight user equipment; and a transmitting module 14, connected with the signaling generating module 12, and configured to send the downlink control signaling to the user equipment, and send the downlink specific reference signals to the user equipment according to the determined ports and the number of layers, for enabling the user equipment to receive the downlink specific reference signals according to the downlink control signaling. Wherein the downlink control signaling generated by the signaling generating module further includes 1 bit of signal indication scrambling identity, in order to support multiplexing of at most sixteen user equipment.

The downlink control signaling generated by the signaling generating module 12 may be specifically DCI2C signaling.

Wherein, the ports indicated by the 5-bits signaling in the downlink control signaling generated by the signaling generating module 12 are antenna ports 7 to 14 defined in LTE R10.

In the 5-bits signaling in the downlink control signaling generated by the signaling generating module 12:
at least eight values indicate two ports used for transmitting the downlink specific reference signals when the number of layers is 2, and a part of or all of the remaining values are configured to indicate the ports used for transmitting the downlink specific reference signals in the case of other number of layers; or,
at least eight values indicate two ports used for transmitting the downlink specific reference signals when the number of layers is 2, at least eight values indicate 1 port used for transmitting the downlink specific reference signals when the number of layers is 1, and a part of or all of the remaining values are configured to indicate the ports used for transmitting the downlink specific reference signals in the case of other number of layers.

In the downlink control signaling generated by the signaling generating module 12, in the information indicated by the 5-bits signaling, eight values are used to sequentially indicate the ports used for transmitting the downlink specific reference signals: (7, 8), (9, 10), (11, 13), (12, 14), (7, 9), (8, 10), (11, 12) or (13, 14).

Further, in the 5-bits signaling in the downlink control signaling generated by the signaling generating module 12, at least six values in the remaining values indicate three ports used for transmitting the downlink specific reference signals when the number of layers is 3, and code division signals and/or frequency division signals exist between the downlink specific reference signals transmitted on the three ports. At least four values in the remaining values indicate four ports used for transmitting the downlink specific reference signals when the number of layers is 4, and code division signals and/or frequency division signals exist between the downlink specific reference signals transmitted on the four ports; at least one value in the remaining values indicates five ports used for transmitting the downlink specific reference signals when the number of layers is 5; at least one value in the remaining values indicates six ports used for transmitting the downlink specific reference signals when the number of layers is 6; at least one value in the remaining values indicates seven ports used for transmitting the downlink specific reference signals when the number of layers is 7; at least one value in the remaining values indicates eight ports used for transmitting the downlink specific reference signals when the number of layers is 8.

The setting of specific signaling values may refer to the setting in the forgoing table 1. Of course, it may be understood that, in other specific embodiments, the meanings represented by the values in the 5-bits signaling may be flexibly configured in a manner different from that in table 1. For example, considering that the condition of the same user equipment multiplexing multiple streams at the same time is less, no high number of layers is configured, while the indication of the port combinations when the number of layers is 2 or 3 is increased, for example, it is configured that 10 values or more values indicate the port combination condition when the number of layers is 2 but do not indicate the port condition when the number of layers is 7 or 8, or is defined to a default value; or the value indicating the port combination when the number of layers is 3 or/and 4 is decreased.

From the point of view of the conception of the embodiment of the present invention, more combinations of the meanings represented by the values in the 5-bits signaling may be made, as long as the conditions of the ports and the number of the layers indicated in the meanings may indicate the basic demand of 8-stream multiplexing is satisfied.

Figure 4:
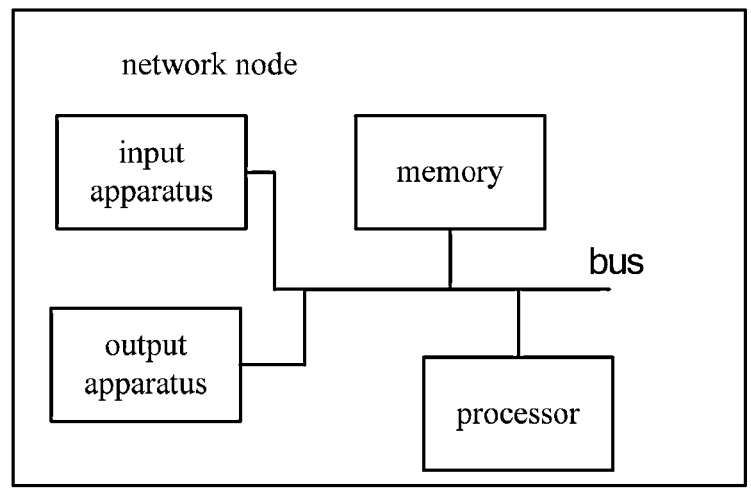
FIG. 4 is a schematic diagram of a specific composition of a network node in an embodiment of the present invention.

As shown in FIG. 4, it is a network node in an embodiment of the present invention, the network node includes an input apparatus, an output apparatus, a memory and a processor, the processor may implement the following steps: determining ports and the number of layers used for transmitting downlink specific reference signals to user equipment; generating downlink control signaling according to the ports and the number of layers, wherein 5-bits signaling in the downlink control signaling is used to indicate the user equipment the ports and the number of layers used for transmitting the downlink specific reference signals, in order to support multiplexing of at most eight user equipment; sending the downlink control signaling to the user equipment, and sending the downlink specific reference signals to the user equipment according to the determined ports and the number of layers, for enabling the user equipment to receive the downlink specific reference signals according to the downlink control signaling. Wherein, the downlink control signaling may further include 1 bit of signal indication scrambling identity, in order to support multiplexing of at most sixteen user equipment.

Wherein, the ports indicated by the 5-bits signaling are antenna ports 7 to 14 defined in LTE R10.

In the 5-bits signaling, at least eight values may be used to indicate two ports used for transmitting the downlink specific reference signals when the number of layers is 2; or at least eight values are further used to indicate 1 port used for transmitting the downlink specific reference signals when the number of layers is 1; and a part of or all of the remaining values are configured to indicate the ports used for transmitting the downlink specific reference signals in the case of other number of layers. Specifically, in the information indicated by the 5-bits signaling, eight values are used to sequentially indicate the ports used for transmitting the downlink specific reference signals: (7, 8), (9, 10), (11, 13), (12, 14), (7, 9), (8, 10), (11, 12) or (13, 14).

Or, at least six values in the remaining values indicate three ports used for transmitting the downlink specific reference signals when the number of layers is 3, and code division signals and/or frequency division signals exist between the downlink specific reference signals transmitted on the three ports; at least four values in the remaining values indicate four ports used for transmitting the downlink specific reference signals when the number of layers is 4, and code division signals and/or frequency division signals exist between the downlink specific reference signals transmitted on the four ports; at least one value in the remaining values indicates five ports used for transmitting the downlink specific reference signals when the number of layers is 5; at least one value in the remaining values indicates six ports used for transmitting the downlink specific reference signals when the number of layers is 6; at least one value in the remaining values indicates seven ports used for transmitting the downlink specific reference signals when the number of layers is 7; at least one value in the remaining values indicates eight ports used for transmitting the downlink specific reference signals when the number of layers is 8.

Wherein, the downlink control signaling may further include 1 bit of signal indication scrambling identity. The downlink control signaling is DCI2C signaling.

The terms in the above-mentioned apparatus embodiment may refer to explanations in the foregoing method embodiment, and will not be repeated redundantly herein.

It can be seen from the above-mentioned descriptions that, in the embodiment of the present invention, under the configuration of an appointed Scrambling identity, namely, when only the 5-bits signaling in the downlink indication signaling is depended on, the multiplexing of at most eight users may be achieved, and the accumulated use number of layers is 8; if the 5-bits signaling and the Scrambling identity are cooperatively used, the multiplexing of at most sixteen users may be achieved, and the accumulated use number of layers of all user equipment (User Equipment, UE) is 16.

Under a multiuser multiplexing mode, the solution in the embodiment of the present invention may be flexibly configured according to an actual wireless environment, a user number of the system and the spatial characteristics of the paired users. Compared with an existing protocol solution, the combination number of the solution is more, such that TM9 may be applied to a multiuser scenario more conveniently, in order to give full play to the advantages of 8 streams and effectively improve the spectrum efficiency.

It should be understood that, the technical solutions of the present invention may be applied to a long term evolution (LTE, Long Term Evolution) system, an advanced long term evolution (LTE-A, Advanced long term evolution) system or the like, the embodiment of the present invention is not limited hereto, but for convenience of description, the embodiment of the present invention will be illustrated by taking the LTE network as an example.

It should also be understood that, in the embodiment of the present invention, the user equipment (UE, User Equipment) may be a mobile station (MS, Mobile Station), a mobile terminal (Mobile Terminal) or the like, for example, may be a mobile telephone (or called cellular phone), a computer with a communication function, and the like, and may also be portable, pocket, hand-held, computer built-in or vehicle-mounted mobile apparatus capable of communicating with the network node.

Those of ordinary skill in the art may understand that all or a part of the flows in the above-mentioned method embodiment may be implemented with a computer program instructing corresponding hardware, the foregoing program may be stored in a computer readable storage medium, and when being executed, the program may include the flows of the embodiments of the above-mentioned methods. Wherein, the storage medium may be a magnetic disk, an optical disk, a read-only memory (Read-Only Memory, ROM), a random access memory (Random Access Memory, RAM) or the like.

The foregoing descriptions are merely a preferred embodiment of the present invention, but the scope of the present invention is not limited thereto. Therefore, equivalent variations made according to the claims of the present invention are still encompassed in the scope of the present invention.

What is claimed is:

1. A reference signal sending method, used in a long term evolution (LTE) network, comprising:
   determining, by a network node, ports and number of layers used for transmitting downlink specific reference signals to user equipment;
   generating, by the network node, downlink control signaling according to the ports and the number of layers, wherein 5-bits signaling in the downlink control signaling is used to indicate the user equipment the ports and the number of layers used for transmitting the downlink specific reference signals, in order to support multiplexing of at most eight user equipment; and
   sending, by the network node, the downlink control signaling to the user equipment, and sending the downlink specific reference signals to the user equipment according to the determined ports and the number of layers, to enable the user equipment to receive the downlink specific reference signals according to the downlink control signaling,
   wherein the downlink control signaling further comprises one bit of signal to indicate a scrambling identity, in order to support multiplexing of at most sixteen user equipment, and
   wherein the ports indicated by the 5-bits signaling are antenna ports 7 to 14 defined in LTE R10.

2. The method of claim 1, wherein at least eight values in the 5-bits signaling are used to indicate two ports used for transmitting the downlink specific reference signals when the number of layers is 2, and a part of or all of remaining values of the at least eight values are configured to indicate ports used for transmitting the downlink specific reference signals in case of other number of layers.

3. The method of claim 2, wherein a part of or all of the remaining values are configured to indicate the ports used for transmitting the downlink specific reference signals in the case of other number of layers, comprising:
   at least eight values in the remaining values indicate one port used for transmitting the downlink specific reference signals when the number of layers is 1.

4. The method of claim 2, wherein the at least eight values indicate two ports used for transmitting the downlink specific reference signals when the number of layers is 2, comprising: eight values are used to sequentially indicate the ports used for transmitting the downlink specific reference signals: (7, 8), (9, 10), (11, 13), (12, 14), (7, 9), (8, 10), (11, 12) or (13, 14).

5. The method of claim 2, wherein a part of or all of the remaining values are configured to indicate the ports used for transmitting the downlink specific reference signals in the case of other number of layers, comprising:
   at least six values in the remaining values indicate three ports used for transmitting the downlink specific reference signals when the number of layers is 3, and the downlink specific reference signals transmitted on the three ports are code division or frequency division;
   at least four values in the remaining values indicate four ports used for transmitting the downlink specific reference signals when the number of layers is 4, and the downlink specific reference signals transmitted on the four ports are code division or frequency division;
   at least one value in the remaining values indicates five ports used for transmitting the downlink specific reference signals when the number of layers is 5;
   at least one value in the remaining values indicates six ports used for transmitting the downlink specific reference signals when the number of layers is 6;
   at least one value in the remaining values indicates seven ports used for transmitting the downlink specific reference signals when the number of layers is 7; and
   at least one value in the remaining values indicates eight ports used for transmitting the downlink specific reference signals when the number of layers is 8.

6. The method of claim 1, wherein the downlink control signaling is Downlink Control Information format 2C (DCI2C) signaling.

7. The method of claim 1, wherein the determining, by the network node, ports and the number of layers used for transmitting downlink specific reference signals to the user equipment, comprises:
   determining, by the network node, the ports and the number of layers used for transmitting the downlink specific reference signals to the user equipment according to the channel conditions of the current user equipment, and determining a multiplexed user equipment.

8. A reference signal sending apparatus, used in a Long Term Evolution (LTE) network, comprising:
   a port determining circuit, configured to determine ports and number of layers used for transmitting downlink specific reference signals to user equipment;
   a signaling generating circuit, connected with the port determining circuit, and configured to generate downlink control signaling according to the ports and the number of layers, wherein 5-bits signaling in the downlink control signaling is used to indicate the user equipment the ports and the number of layers used for transmitting the downlink specific reference signals, in order to support multiplexing of at most eight user equipment; and
   a transmitter, connected with the signaling generating circuit, and configured to send the downlink control signaling to the user equipment, and send the downlink specific reference signals to the user equipment according to the determined ports and the number of layers, to enable the user equipment to receive the downlink specific reference signals according to the downlink control signaling,
   wherein the downlink control signaling generated by the signaling generating circuit further comprises one bit of signal to indicate a scrambling identity, in order to support multiplexing of at most sixteen user equipment, and
   wherein the ports indicated by the 5-bits signaling in the downlink control signaling generated by the signaling generating circuit are antenna ports 7 to 14 defined in LTE R10.

9. The apparatus of claim 8, wherein in the 5-bits signaling in the downlink control signaling generated by the signaling generating circuit:
   at least eight values indicate two ports used for transmitting the downlink specific reference signals when the number of layers is 2, and a part of or all of remaining values of the at least eight values are configured to indicate ports used for transmitting the downlink specific reference signals in case of other number of layers; or,
   at least eight values indicate two ports used for transmitting the downlink specific reference signals when the number of layers is 2, at least eight values indicate one port used for transmitting the downlink specific reference signals when the number of layers is 1, and a part of or all of the remaining values are configured to indicate the ports used for transmitting the downlink specific reference signals in case of other number of layers.

10. The apparatus of claim 9, wherein in the downlink control signaling generated by the signaling generating circuit, eight values are used to sequentially indicate the ports used for transmitting the downlink specific reference signals: (7, 8), (9, 10), (11, 13), (12, 14), (7, 9), (8, 10), (11, 12) or (13, 14).

11. The apparatus of claim 9, wherein in the downlink control signaling generated by the signaling generating circuit,
- at least six values in the remaining values indicate three ports used for transmitting the downlink specific reference signals when the number of layers is 3, and the downlink specific reference signals transmitted on the three ports are code division or frequency division;
- at least four values in the remaining values indicate four ports used for transmitting the downlink specific reference signals when the number of layers is 4, and the downlink specific reference signals transmitted on the four ports are code division or frequency division;
- at least one value in the remaining values indicates five ports used for transmitting the downlink specific reference signals when the number of layers is 5;
- at least one value in the remaining values indicates six ports used for transmitting the downlink specific reference signals when the number of layers is 6;
- at least one value in the remaining values indicates seven ports used for transmitting the downlink specific reference signals when the number of layers is 7; and
- at least one value in the remaining values indicates eight ports used for transmitting the downlink specific reference signals when the number of layers is 8.

12. The apparatus of claim 8, wherein the downlink control signaling generated by the signaling generating circuit is Downlink Control Information format 2C (DCI2C) signaling.

13. A network node, comprising a reference signal sending apparatus, used in a Long Term Evolution (LTE) network, comprising:
- a port determining circuit, configured to determine ports and number of layers used for transmitting downlink specific reference signals to user equipment;
- a signaling generating circuit, connected with the port determining circuit, and configured to generate downlink control signaling according to the ports and the number of layers, wherein 5-bits signaling in the downlink control signaling is used to indicate the user equipment the ports and the number of layers used for transmitting the downlink specific reference signals, in order to support multiplexing of at most eight user equipment; and
- a transmitter, connected with the signaling generating circuit, and configured to send the downlink control signaling to the user equipment, and send the downlink specific reference signals to the user equipment according to the determined ports and the number of layers, to enable the user equipment to receive the downlink specific reference signals according to the downlink control signaling,
- wherein the downlink control signaling generated by the signaling generating circuit further comprises one bit of signal to indicate a scrambling identity, in order to support multiplexing of at most sixteen user equipment, and
- wherein the ports indicated by the 5-bits signaling in the downlink control signaling generated by the signaling generating circuit are antenna ports 7 to 14 defined in LTE R10.

* * * * *